United States Patent [19]

Hammerle

[11] 4,420,859
[45] Dec. 20, 1983

[54] TWO-PART PANEL FASTENER

[75] Inventor: Frederick A. Hammerle, Topsfield, Mass.

[73] Assignee: TRW Inc., Cleveland, Ohio

[21] Appl. No.: 308,225

[22] Filed: Oct. 5, 1981

[51] Int. Cl.³ .............................................. A44B 21/00
[52] U.S. Cl. ....................................... 24/585; 24/627; 24/662; 24/683; 24/682; 24/697
[58] Field of Search ............. 24/208 R, 208 A, 213 R, 24/213 B, 214, 216, 217 R, 290, 292, 297; 411/510

[56] References Cited

U.S. PATENT DOCUMENTS

| | | | |
|---|---|---|---|
| 3,213,506 | 10/1965 | Fernberg | 24/217 |
| 3,335,471 | 8/1967 | Seckerson et al. | 24/221 R |
| 3,860,999 | 1/1975 | Meyer | 411/510 |
| 4,122,583 | 10/1978 | Grittner et al. | 24/213 R X |
| 4,138,921 | 2/1979 | McGauran et al. | 411/510 |

FOREIGN PATENT DOCUMENTS 2738703  3/1979  Fed. Rep. of Germany ........ 24/214

Primary Examiner—Robert P. Swiatek
Attorney, Agent, or Firm—James R. O'Connor

[57] ABSTRACT

A two-part panel fastener comprises a socket member and a stud member. The socket member includes a base, an elongated retaining head supported above one side of the base, a receptacle defining a central bore extending from the opposite side of the base, a lip which constricts the opening to the bore, and a frusto-conically shaped flange extending from the end of the receptacle and having a concave surface facing away from the base and surrounding the opening to the bore. The elongated retaining head is adapted to pass through an elongated or "double-D" shaped aperture in a first panel and to be retained relative to the first panel when the head is turned a quarter-turn. The stud member includes an upper shank with a plurality of circumferential ridges which interengage with the lip when the upper shank is inserted into the bore of the receptacle to permit the stud member and socket member to be removably joined together, a lower shank with a plurality of circumferential ridges which flex inwardly as the lower shank is pressed through an aperture in a second panel and which expand after they clear the aperture to hold the stud member relative to the second panel, and a relatively rigid collar between the lower and upper shanks which limits the travel of the lower shank into the second panel aperture.

17 Claims, 10 Drawing Figures

TWO-PART PANEL FASTENER

BACKGROUND OF THE INVENTION

This invention relates to panel fasteners, and more particularly, to an improved two-part, resilient fastener for releasably fastening together two apertured panels.

There is a continuing need in industry for new and improved fasteners capable of fastening together apertured panels. For example, in the automobile industry, fasteners of this type are commonly used for attaching a trim panel, such as that covering the inside of a vehicle door, to an apertured metal panel forming part of the body of the vehicle. In automobile and other applications of this type, the fasteners typically must meet many requirements. For example, because a large number of the fasteners are usually used at spaced intervals to secure the panels and because of cost considerations in general, the fasteners must be economical to manufacture. Yet, the fasteners must serve to hold the panels firmly and securely together so as to prevent loosening or rattling of the panels under vibration. In many applications, particularly automobile applications, the fasteners must also permit one of the panels to be released from the other, such as when the vehicle requires repair, and then to be fastened together again securely and in accurate alignment after the repair. Preferably, the fasteners should permit such release and replacement without the need for special tools.

In addition, the fasteners should be capable of accommodating production tolerances in the positioning and size of the apertures in the panels and in the thickness of the panels themselves, while permitting the panels to be accurately aligned relative to one another and securely attached. The fasteners should also be easy to install in the panel apertures, preferably being capable of installation by automated machines of the kind now commonly found on many modern day vehicle assembly lines. Finally, it is at least desirable, and in many cases necessary, that the fasteners seal the apertures in the panels after they are fastened together so as to prevent the leakage of moisture or the like through the apertures in the assembled product.

A wide variety of fastener designs and constructions have been used and proposed heretofore which meet one or more of the above requirements. Examples of such prior fasteners are disclosed in the following patents: U.S. Pat. Nos. 3,029,486; 3,119,476; 3,213,506; 3,249,973; 3,271,059; 3,550,217; 3,577,603; 3,678,797; 3,745,612; and 3,771,275; British Pat. Nos. 1,113,757; 1,129,250; 1,316,472; 1,543,321; and 1,570,108.

As can be appreciated from the referenced patents, two-part fasteners are common which comprise a stud member that engages in an aperture in one of the panels, and a socket member that engages in an aperture in the other of the panels. The stud member and socket member are then snapped, press-fit or otherwise joined together to fasten the panels to one another. Typically, the aperture sealing function is performed by a resilient flange formed integrally with the stud member of the fastener, which flange covers and seals the aperture when the stud member is engaged in its associated panel.

SUMMARY OF THE INVENTION

A primary object of the present invention is to provide an improved panel fastener of the above-described type which is capable of releasably joining together two apertured panels.

Another object of the invention is to provide an improved panel fastener which meets each of the above-described requirements and which is thus ideally suited for automobile and related applications.

Other more specific objects of the invention will, in part, be obvious and will, in part, appear hereinafter.

Briefly, a panel fastener embodied in accordance with the present invention is comprised of two parts, namely, a socket member and a stud member. The socket member is adapted to be inserted and retained relative to a first panel, such as a trim panel for the inside of a door of a vehicle, which has an aperture that is elongated or "double-D" in shape. To this end, the socket member includes a base that is adapted to bear against one surface of the first panel, and an upstanding retainer extending from one side of the base. The elongated aperture in the first panel and the retainer of the socket member are relatively dimensioned so that when the retainer is oriented parallel to the long dimension of the aperture, it readily passes through the aperture to the opposite surface of the panel. However, when the retainer is turned a quarter-turn from that orientation with the base bearing against the one surface of the panel, the retainer overlaps the opposite surface of the panel to retain the socket member relative to the panel. The base preferably is shaped so that it can be gripped and turned during installation using a suitable tool fitting such as a hexagonal socket. A plurality of flexible fingers project outwardly from the retainer parallel to the plane of the base. The fingers, which bear against the edges of the panel defining the aperture and flex as the socket member is turned through a quarter-turn, resist turning of the retainer back to an orientation in which it is parallel to the long dimension of the aperture. This prevents the socket member from accidentally dislodging from the first panel once it is installed therein.

The socket member also includes a receptacle which extends from the side of the base opposite the retainer. The receptacle is formed with a central bore which extends into the socket member and with a frusto-conically shaped flange, the concave portion of which faces away from the base and surrounds the central bore. A lip is formed around the opening of the central bore for engaging the stud member of the fastener, as explained more fully below.

The stud member includes a lower shank for engaging within a circular aperture in a second panel, such as a metal body panel forming part of the vehicle door, an upper shank for engaging within the central bore of the socket member, and a collar which is intermediate to the upper and lower shanks. The lower shank terminates more or less in a point to facilitate its insertion in the aperture of the second panel. It also includes a plurality of relatively resilient circumferential ridges adjacent one another along its axis. Each such ridge is frusto-conically shaped with a convex portion facing the tip of the lower shank and a concave portion facing the collar of the stud member. Each ridge also has a maximum diameter somewhat greater than the diameter of the aperture in the second panel. As the stud member is forced into the aperture on one surface of the second panel, the ridges flex radially inwardly until they clear the opposite surface of the second panel where they resiliently expand to the original shape to hold the stud member in the second panel. The collar of the stud member, by bearing against the one surface of the second panel, limits the travel of the lower shank portion into the aperture. The ridge that is closest to the shoulder is preferably axially spaced somewhat from the collar to accommodate the thickness of the second panel. A plurality of axial ribs are formed in that space to strengthen the stud member and help maintain the stud member perpendicular to the plane of the second panel after it is installed therein.

The upper shank of the stud member also terminates more or less in a point to facilitate its insertion in the central bore of the socket member, and also includes a plurality of circumferential ridges adjacent one another along its axis which have a maximum diameter somewhat greater than the diameter of the opening to the central bore. As the upper shank is inserted into the central bore, the lip surrounding the bore opening and-/or the ridged flex to permit the ridges to pass into the bore. The lip then expands and settles in a groove between two of the ridges to hold the socket member relative to the stud member. The collar of the stud member limits the travel of the upper shank into the bore by bearing against the inside (i.e. concave) surface of the socket member flange when the upper shank is fully inserted.

Preferably, the fastener is installed in an assembled condition, that is, with the socket member and stud member already joined and locked together, initially in the first panel having the elongated slot (e.g., the trim panel). This eliminates the need to handle and to separately install the two fastener parts as is the case with many prior two-part fasteners. Installation can thus be accomplished by an automated machine having one or more extendable arm carrying a socket-like fitting which grips the base of the fastener, extends the retainer into the elongated aperture of the first panel, and turns the fastener a quarter-turn to secure it in place. The first panel with the fasteners installed therein is then brought adjacent to the second panel and the lower shanks of the respective fasteners are guided into the circular apertures in the second panel. Each fastener is then pressed into its associated aperture in the second panel to secure the panels together. The flange on the socket member of the fastener bears against the second panel and seals the aperture to prevent the leakage of moisture or the like through the aperture.

When it becomes necessary to remove the first panel from the second panel, the first panel may be pulled or pried away in the vicinity of each fastener until the socket member separates from the stud member of each fastener. Each socket member remains in place in the first panel and each stud member remains in place in the second panel after separation of the panels, thus minimizing the likelihood that any fastener parts are lost during the operation. When the panels are to be secured together again, the first panel is simply brought adjacent the second panel, aligned, and pressed in the vicinity of each fastener to again join the fastener socket members to the fastener stud members. The concave surface of the flange on the socket member of each fastener serves as an enlarged area guide for guiding the two fastener parts together. Thus, by including the flange on the socket member rather than on the stud member, the flange serves the dual purpose of sealing the panel aperture and of making reattachment and realignment of the panels after their separation a relatively easy task.

Both the socket member and stud member of the fastener may be fabricated from a suitable plastic material by injection molding. This makes the fastener economical to fabricate particularly in production quantities.

BRIEF DESCRIPTION OF THE DRAWING

The foregoing and other objects, features and advantages of the invention will be better understood by reference to the following detailed description taken in conjunction with the accompanying drawing in which.

DETAILED DESCRIPTION OF ILLUSTRATIVE EMBODIMENT

Figure 1:
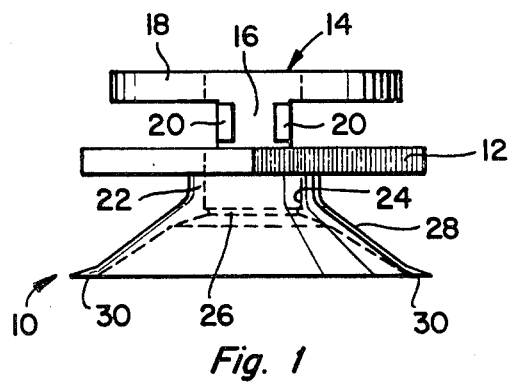
FIG. 1 is a side elevation view of a socket member forming one part of a two-part fastener embodied according to the invention.
Figure 2:
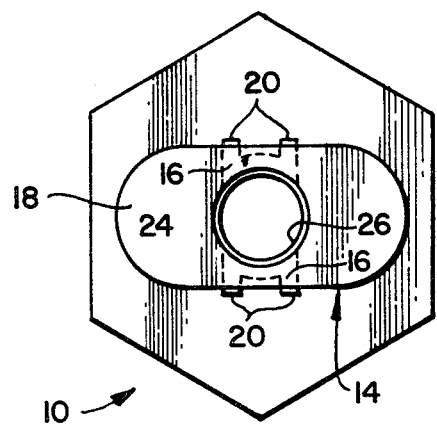
FIG. 2 is a top view of the socket member shown in FIG. 1.

Referring now specifically to the drawing, and initially to FIGS. 1 and 2 thereof, there is shown a socket member 10 forming one part of a two-part panel fastener embodied in accordance with the invention. The socket member 10 includes a base 12 which in this particular embodiment has a hexagonal shape. Projecting above one side of the base 12 is a retainer 14. The retainer 14 comprises a pair of upstanding legs 16 and an elongated, or "double-D" shaped, head 18 which is supported by the legs 16 above the base 12. The distance between the bottom surface of the head 18 and the top surface of the base 12 is preferably equal to or greater than the thickness of the panel in which the socket member 10 is to be installed, as explained more fully below.

Each leg 16 includes a pair of fingers 20 which extend outwardly below the head 18 in a direction perpendicular to the long dimension of the head 18. As seen in FIG. 2, each finger 20 projects somewhat beyond the respective side edges of the head 18.

As best seen in FIG. 1, the socket member 10 also includes a receptacle 22 which extends from the side of the base 12 opposite to the retainer 14. The receptacle 22 defines a central bore 24 which, in this particular embodiment, extends through the receptacle 22, the base 12 and the head 18. A lip 26 is formed around the opening to the bore 24 at the lower end of the receptacle 22. Also extending from the lower end of the receptacle 22 is a frusto-conically shaped flange 28, the concave surface of which faces away from the base 12. The flange 28 has a maximum diameter at its lower extremity equal to or slightly less than the distance across the flats of the base 12. Because of the relatively small thickness of the flange 28 as compared to that of the base 12, the flange 28 is relatively resilient or flexible as compared to the base 12. The peripheral edge of the flange 28 may be upturned and flattened slightly as indicated at 30, so that it bears flushly against a flat panel surface.

Figure 3:
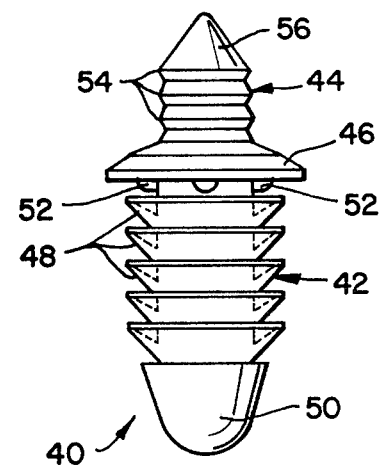
FIG. 3 is a side elevation view of a stud member forming the other part of the two-part fastener embodied according to the invention.

FIG. 3 illustrates a stud member 40 forming the other part of a two part panel fastener embodied in accordance with the invention. The stud member 40 comprises a lower shank 42, an upper shank 44, and collar 46 which separates the upper shank 44 and the lower shank 42. The lower shank 42 includes a plurality of (e.g., five) circumferential ridges 48 adjacent one another and spaced along its axis. Each ridge 48 is frusto-conically shaped with its convex portion facing the end or tip 50 of the lower shank 42 and its concave portion facing the collar 46. Each ridge 48 is also relatively flexible inwardly toward the axis of the lower shank 42. The ridge 48 closest to the collar 46 is preferably spaced somewhat below the collar 46 to accommodate the thickness of the panel with which it is to be engaged. A plurality of (e.g., four) axial ribs 52 are formed in the space below the collar 46. None of the ribs 52 projects outwardly beyond the maximum diameter of the collar 46.

Figure 7:
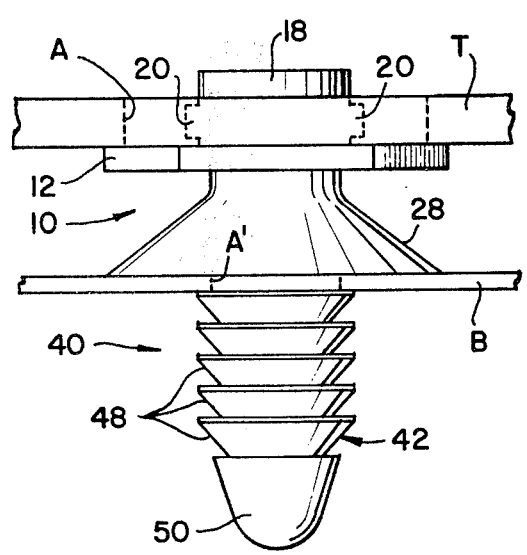
FIG. 7 illustrates the first and second apertured panels fastened together by the two-part fastener of the invention.

The upper shank 44 in this particular embodiment is shorter in length than the lower shank 42. The upper shank 44 also includes a plurality of circumferential ridges 54 axially spaced along substantially its entire length. The maximum diameter of each of the ridges 54 is preferably equal to or somewhat less than the diameter of the central bore 24 in the socket member 10, but is greater than the diameter of the opening into the bore 24 defined by the lip 26. This enables the upper shank 44 of the stud member 40 to be pressed into the bore 24 of the socket member 10, the lip 26 and/or the ridges 54 to flex inwardly as they pass one another, and the socket and stud members 10 and 40 to be joined and held together when the lip 26 resiliently expands into a groove between two of the ridges 54 on the upper shank 44. The collar 46 limits the extent of travel of the upper shank 44 into the bore 24 when it bears against the concave surface of the flange 28. To this end, the upper surface of the collar 46 is tapered so that it bears tightly against the concave surface of the flange 28. The length of the upper shank 44 is preferably such that, when the upper shank 44 is fully inserted in the bore 24, it does not project above the head 18 of the socket member 10, as shown in FIG. 7.

Both the tip 50 of the lower shank 42 and the tip 56 of the upper shank 44 are preferably formed more or less in a point. This facilitates insertion of the upper shank 44 in the bore 24 of the socket member 10, and insertion of the lower shank 42 in the aperture of its associated panel, as described below. Additionally, both the socket member 10 and the stud member 40 are preferably fabricated from a plastic material, such as polypropelene, nylon or the like, by injection molding. This permits the fasteners to be made relatively cheaply in large quantities, yet with the required strength and dimensional tolerances to insure proper fit and operation.

Figure 4:
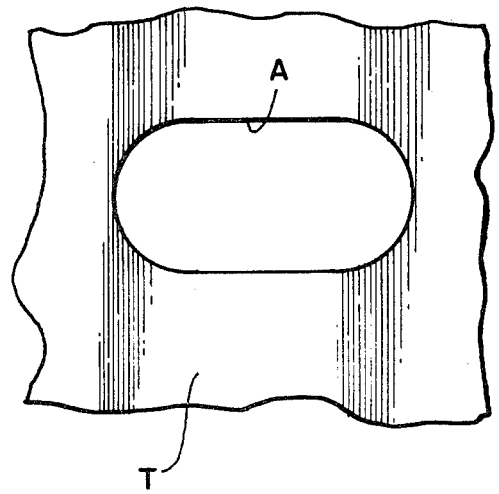
FIG. 4 is a side view of a first apertured panel to be fastened having an elongated or "double-D" aperture.
Figure 5:
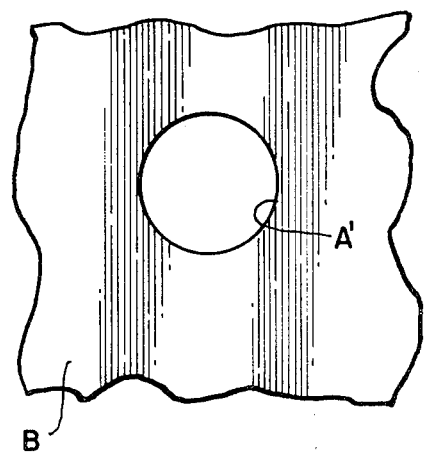
FIG. 5 is a side view of a second apertured panel to be fastened having a circular aperture.

FIG. 4 illustrates a portion of a first panel T, and FIG. 5 illustrates a portion of a second panel B, which are to be joined together with the above described fastener. The panel T, which is illustratively a trim panel of the type that covers the inside of a vehicle door, includes an elongated or "double-D" shaped aperture A. The panel B, which is illustratively part of the metal body structure of the vehicle door, includes a circularly shaped aperture A'. It will be appreciated that the panels T and B would typically include a plurality of apertures A and A', respectively, spaced at selected intervals around their respective peripheries, each of which aperture pair is to receive a fastener.

Figure 6:
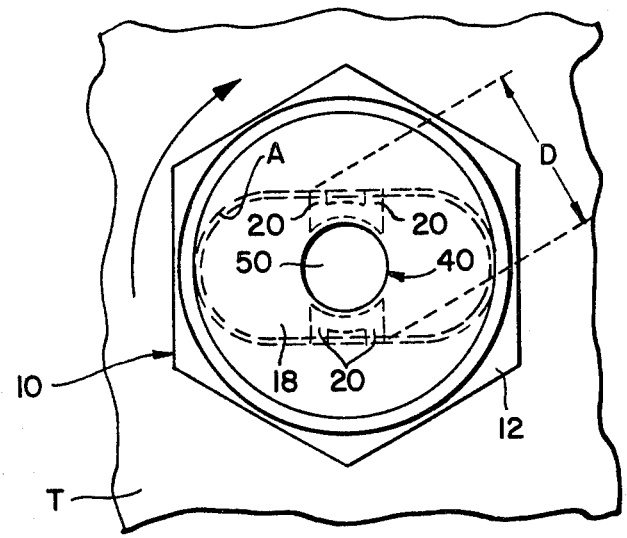
FIG. 6 illustrates the two-part fastener of the invention in the process of being inserted in the first apertured panel.

The fastener described above is adapted to be installed in an assembled condition, that is, with the socket member 10 and stud member 40 already joined and locked together, initially in the panel T with the elongated aperture A. As shown in FIG. 6, the dimensions of the aperture A in the panel T are preferably selected to be somewhat larger than the dimensions of the head 18 and the laterally extending fingers 20 so that the head 18 and fingers 20 readily pass through the aperture A when the head 18 is oriented generally parallel to the long dimension of the aperture A. After the head 18 is passed through the aperture A and the base 12 is brought to bear against the surface of the panel T shown in FIG. 6, the head 18 (e.g., the entire fastener) is turned a quarter-turn so that the head 18 overlaps the opposite surface of the panel T and retains the fastener in place. Depending upon the direction in which the fastener is turned, two diametrically opposed fingers 20 will bear against the edges of the panel T defining the aperture A and resist the turning but will nonetheless flex and deform if sufficient turning torque is applied to permit the fastener to be turned through the quarter-turn. The fingers 20 will then resist turning of the fastener in either direction back to an orientation in which the head 18 is parallel to the aperture A and thus prevent the fastener from being dislodged accidentially from the panel T.

It will be appreciated that the exact dimensions of the aperture A in the panel T may vary over a considerable range without affecting the proper functioning of the fastener. It is desirable only that the aperture A have a length which is sufficient to permit the head 18 to pass through the aperture A when the head 18 is oriented generally parallel thereto, and a width (i.e., the dimension perpendicular to its long dimension) that is somewhat less than the diagonal distance D indicated in FIG. 6 between the fingers 20 on diametrically opposite sides of the head 18, so that the fingers 20 operate in the desired fashion. It will also be appreciated that the operation of installing the fastener in the panel T can readily be performed by an automated machine having one or more extendable arms or other such members with a socket-like fitting for gripping the base 12 of the fastener, extending it into the aperture A and turning it through the desired quarter turn.

Once the required number of fasteners are installed in the panel T, the panel T is brought adjacent the panel B and the lower shank 42 of each fastener is guided and pressed into the circularly shaped aperture A' in the panel B to secure the two panels together. FIG. 7 illustrates the panels T and B after they are fastened together. The aperture A' in the panel B preferably has a diameter that is equal to or greater than that defined by the outer edges of the ribs 52, but less than the maximum diameter of the ridges 48 so that the ridges 48 flex inwardly as they pass through the aperture A' and then resiliently expand to their original shape after they clear the aperture A' to hold the lower shank 42 in place. It will be noted that the flange 28, by resiliently bearing against the upper surface of the panel B in FIG. 7, seals the aperture A' to prevent the leakage of moisture or the like therethrough.

Figure 8:
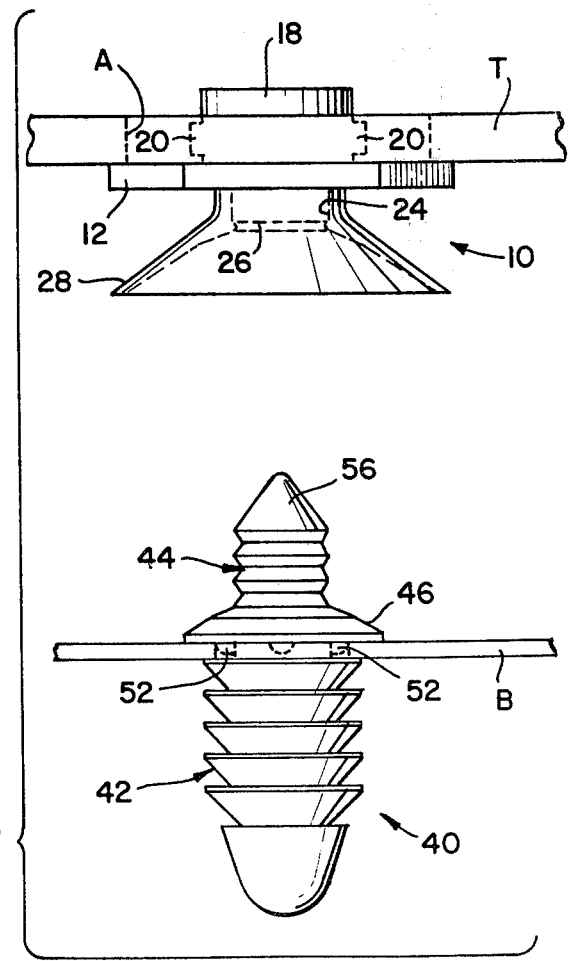
FIG. 8 illustrates the first and second apertured panels separated from one another with the socket member and stud member, respectively, of the two-part fastener of the invention remaining in place.

FIG. 8 illustrates the panels T and B after the socket member 10 has been pried, pulled or otherwise moved away from the stud member 40. Even when the panels T and B are separated, the socket member 10 remains in place in the panel T and the stud member 40 remains in place in the panel B. The ribs 52 on the lower shank 42 strengthen the stud member 40 in the vicinity of the panel B and help maintain the stud member 40 generally perpendicular to the plane of the panel B to facilitate the later reattachment of the panels T and B. When the panels T and B are to be reattached, they are simply brought together again, roughly aligned, and pressed together in the vicinity of the fasteners. The concave surface of the flange 28 cooperates with the tapered tip 56 of the upper shank 44 to move the socket and stud members into final alignment for reattachment should the panels T and B be out of alignment slightly in any direction during the process of reattaching the panels.

Figure 9:
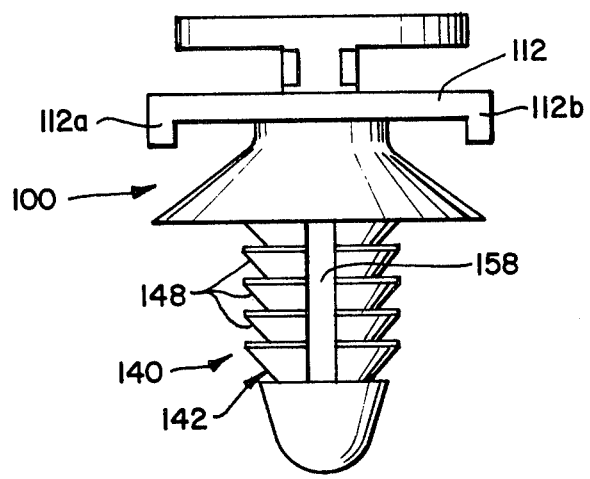
FIGS. 9 and 10 are side and top views, respectively, of a somewhat modified two-part fastener embodied in accordance with the invention.
Figure 10:
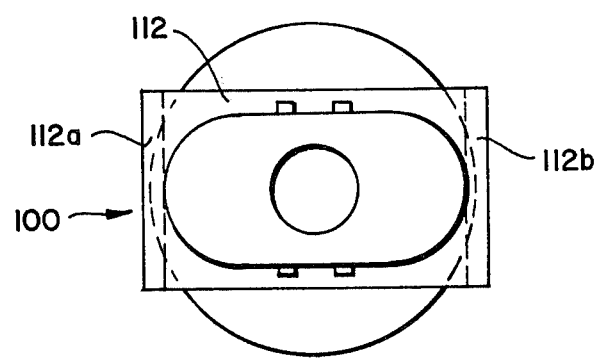

FIGS. 9 and 10 illustrate a slightly modified two-part fastener embodied according to the invention. Shown joined together in FIGS. 9 and 10 are a socket member 100 and a stud member 140. The socket member 100 is illustratively identical to the socket member 10 previously described except for the configuration of its base 112. As best seen in FIG. 10, the base 112 of the socket member 100 is rectangular in shape, rather than hexagonal in shape, but nonetheless still defines opposed flats 112a and 112b which can be gripped by the opposed surfaces of a hexagonal socket fitting. As seen in FIG. 9, the flats 112a and 112b are extended downwardly below the plane of the base 112 so as to provide a larger gripping area for the socket fitting when the member 100 is being installed.

The stud member 140 is illustratively identical to the stud member 40 previously described except for the formation of an axial groove 158 through the ridges 148 and into opposite sides of the lower shank 142 of the stud member 140. The grooves 158 (only one of which is visible in FIG. 9) bisect the ridges 148, making the ridges 148 somewhat more inwardly flexible than the continuous ridges 48 in the stud member 40 previously described. As a result, the force required to load the stud member 140 into the aperture A of the panel B of FIG. 5 is less than the force required to load the stud member 40.

It should be understood that the foregoing detailed description is intended to illustrate rather than limit the invention. Various modifications to the specifically described embodiments will be recognized as possible by those skilled in the art without departing from the scope of the invention as defined by the appended claims.

I claim:

1. A two-part fastener for attaching two apertured panels together, comprising a socket member and a stud member, said socket member comprising a base, a retainer extending from one side of said base, said retainer including an elongated head supported above said base and which is adapted to pass through an elongated aperture in a first one of the panels in that said head and the aperture are relatively dimensioned to permit the head to pass through the aperture from one surface of the panel when the head is oriented so that it lies generally parallel to the longer dimension of the aperture, and to retain said socket member relative to the first panel when said head is turned a quarter turn from said orientation so that it overlaps the opposite surface of the panel, a receptacle extending from a side of said base opposite said retainer and defining a bore and an opening to the bore, and a flange extending from said receptacle and having a concave surface facing away from said base and surrounding the opening to the bore, said stud member comprising a lower shank adapted to pass through an aperture in a second one of the panels and to retain said stud member relative to the second panel, a collar for limiting the travel of said lower shank through the aperture in the second panel, and an upper shank adapted to pass through the opening into the bore of said receptacle of said socket member and to retain said stud member relative to said socket member.

2. The fastener of claim 1 in which said receptacle of said socket member includes a lip formed around the opening to the bore which constricts the opening relative to the bore, and in which said upper shank of said stud member includes at least one circumferential ridge for interengaging with said lip when said upper shank is inserted into the bore to retain said stud member relative to said socket member.

3. The fastener of claim 2 in which said upper shank of said stud member includes more than one circumferential ridge, said ridges being axially spaced along substantially the entire length of said upper shank.

4. The fastener of claim 1 in which said retainer on said socket member further includes a plurality of fingers which project outwardly between said base and said head in a direction that is traverse to the long dimension of said head, said fingers being adapted to bear against the edge of the first panel defining the elongated aperture therein when said head is turned relative to the first panel thereby to resist such turning, said fingers being further adapted to deform to permit such turning of said head when sufficient turning torque is applied to said head.

5. The fastener of claim 1 in which said lower shank of said stud member includes at least one circumferential ridge which is adapted to flex inwardly as said lower shank is passed through the aperture in the second panel and to expand to its original shape when it clears the aperture in the second panel to hold said stud member relative to the second panel.

6. The fastener of claim 5 in which the aperture in the second panel is circularly shaped and in which said at least one circumferential ridge on said lower shank of said stud member is frusto-conically shaped having a convex surface facing toward the free end of said lower shank and a concave surface facing said collar of said stud member, at least one ridge having a maximum diameter greater than the diameter of the second panel aperture.

7. The fastener of claim 6 in which said lower shank of said stud member includes more than one circumferential ridge, said ridges being axially spaced along said lower shank.

8. The fastener of claim 2 in which the one of said circumferential ridges on said lower shank that is closest to said collar of said stud member is axially spaced from said collar and in which said lower shank further includes a plurality of axial ribs formed at radially spaced apart positions in such space, said ribs extending radially outwardly from said lower shank to a distance that is equal to or less than the diameter of the aperture in the second panel.

9. The fastener of claim 7 in which said lower shank of said stud member defines a pair of spaced apart grooves disposed axially of said lower shank and which bisect each of said circumferential ridges.

10. The fastener of claim 5 in which said lower shank of said stud member defines a pair of spaced apart grooves disposed axially of said lower shank and which bisect said at least one circumferential ridge.

11. The fastener of claim 1 in which the free end of said upper shank is tapered more or less to a point.

12. The fastener of claim 1 in which the free end of said lower shank is tapered more or less to a point.

13. The fastener of claim 1 in which said base of said socket member has a hexagonal shape.

14. The fastener of claim 1 in which said base of said socket member has a rectangular shape.

15. The fastener of claim 14 in which said rectangularly shaped base includes a flat extending downwardly from each of its opposed ends in the direction of said flange.

16. The fastener of claim 1 in which each of said socket member and said stud member is integrally formed from a plastic material.

17. An assembly of a first panel fastened to a second panel by means of a two-part fastener comprising a socket member and a cooperating stud member, said first panel defining at least one aperture that is elongated in shape, said second panel also defining at least one aperture, said socket member comprising a base, an elongated retaining head supported above one side of said base, said head being adapted to pass through the elongated aperture from one surface of said first panel when said head has an orientation that is generally parallel to the long dimension of said first panel aperture and to overlap the opposite surface of said first panel when said head is turned in quarter-turn from said orientation thereby to hold said socket member relative to said first panel, said socket member further including a receptacle extending from a side of said base opposite said retaining head and defining a bore and an opening to said bore and a flange extending from said receptacle and having a concave surface facing away from said base and surrounding the opening to the bore, said flange bearing against a surface of said second panel, said stud member comprising a lower shank having means formed thereon which pass through the aperture in said second panel and retain said stud member relative to said second panel and an upper shank having means formed thereon which pass through the opening into the bore of said receptacle of said socket member and removably retain said stud member relative to said socket member and thus removably retain said first panel relative to said second panel.

* * * * *